(No Model.) 2 Sheets—Sheet 2.
E. A. SPERRY & J. VANDENBURGH.
VEHICLE WHEEL.
No. 263,982. Patented Sept. 5, 1882.
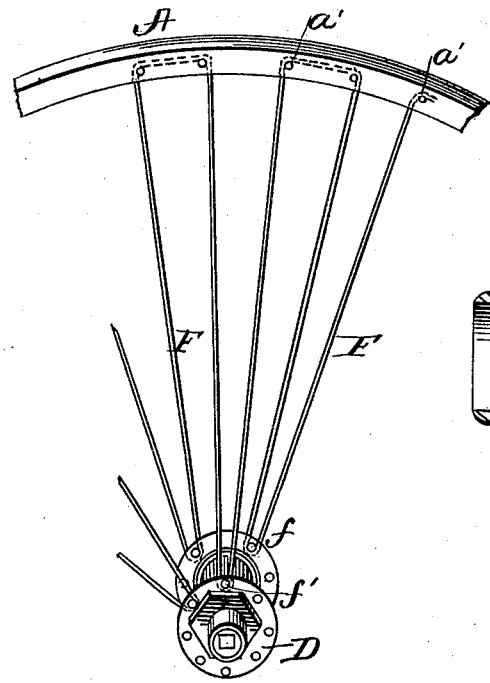
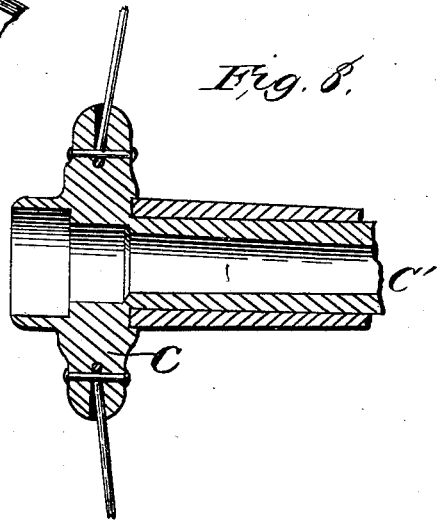
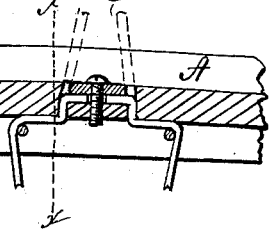

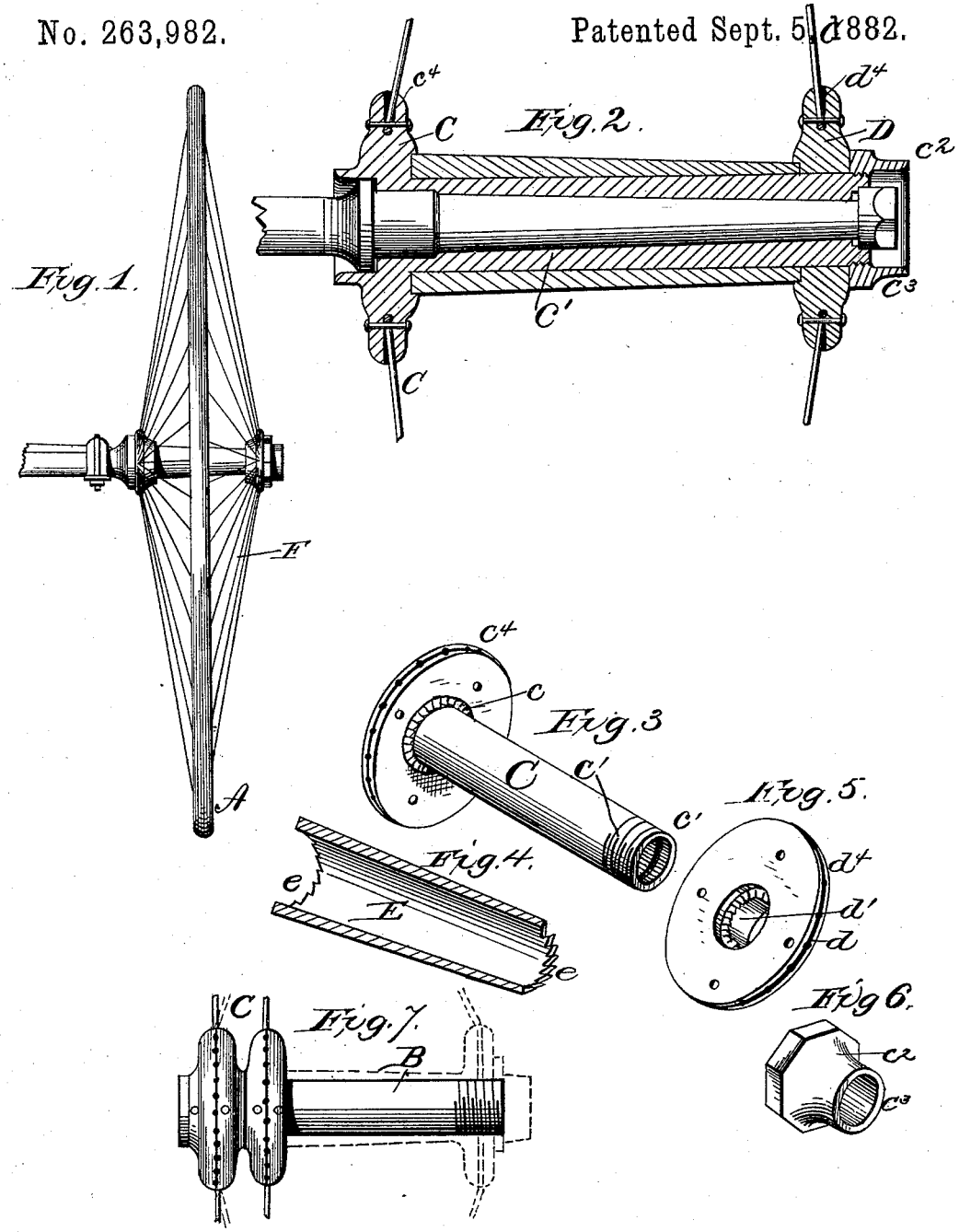

UNITED STATES PATENT OFFICE.

ELMER A. SPERRY AND JESSE VANDENBURGH, OF CORTLAND, NEW YORK.

VEHICLE-WHEEL.

SPECIFICATION forming part of Letters Patent No. 263,982, dated September 5, 1882.

Application filed September 7, 1881. (No model.)

*To all whom it may concern:*

Be it known that we, ELMER A. SPERRY and JESSE VANDENBURGH, both citizens of the United States, residing at Cortland, in the county of Cortland and State of New York, have invented certain new and useful Improvements in Metallic Vehicle-Wheels; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Our invention relates to metallic wheels for vehicles, and more particularly to that class of wheels in which wire spokes are used and secured alternately to the hub at different inclinations.

The invention consists in a metallic wheel in which the alternate spokes or pairs of spokes are secured to separate disks or flanges on the hub and strained or tensioned simultaneously.

The invention further consists in a metallic wheel in which the alternate spokes or pairs of spokes are secured to separate disks or flanges on the hub and strained or tensioned simultaneously by lateral separation and by rotation of said disks in opposite directions.

The invention further consists in the combination, with a metallic wheel whose alternate spokes or pairs of spokes are secured to separate disks or flanges of the hub and adapted to be tensioned by lateral separation, of devices for holding said disks apart.

The invention further consists in the combination, with a wheel whose alternate spokes or pairs of spokes are adapted to be secured to separate disks or flanges on the hub, of toothed flanges and a similarly-toothed brace adapted to hold said disks apart and to clutch the same upon their being rotated.

The invention further consists in the combination, with a felly having an interior annular recess and a hub provided with annularly-recessed disks or flanges, of rivets and spokes, two or more of the latter being formed of a continuous length or piece of wire.

The invention further consists in the combination, with a wheel whose alternate spokes or pairs of spokes are secured to separate disks or flanges of the hub, of a disk provided with a sleeve forming the hub of the wheel, and a second spoke-receiving disk bored to slide upon said hub, and suitable devices for holding said disks apart and also in their rotated position.

The invention further consists in the parts and combination of parts hereinafter fully set forth, and pointed out in the claims.

In the drawings, Figure 1 is a front elevation of a wheel constructed in accordance with our invention and secured to a vehicle. Fig. 2 is a longitudinal section through the hub and its attachments. Fig. 3 is a detached view, in perspective, of one of the spoke-receiving disks with its sleeve in hub, showing clutch-teeth. Fig. 4 is a similar view of one of the semi-cylindrical toothed braces for holding the disks of the hub apart and also in their rotated or angular position. Fig. 5 is a view in perspective of the toothed sliding spoke-receiving disk. Fig. 6 is a similar view of a jam-nut applied to the outer end of the sleeve. Fig. 7 is a detached view of the hub and the two spoke-receiving disks, the full lines showing said disks in position to receive the spokes, and the dotted lines showing the sliding disk in position after the spokes have been tensioned. Fig. 8 is a section of one end of the hub, showing the manner of securing the spokes to the disks. Fig. 9 is a perspective view of a portion of a wheel having its spokes secured according to our invention. Fig. 10 is a section of a portion of a felly illustrating our improved manner of connecting the spokes thereto. Fig. 11 is a similar view, showing the felly and tire provided with an intermediate elastic layer. Fig. 12 is a section of a portion of a felly, showing one manner of securing the ends of the spoke-forming wire. Fig. 13 is a section on the end $x\ x$, Fig. 12.

A represents the felly of a wheel, provided with an interior annular recess, $a$, and at points equidistant apart with headed rivets $a'$, adapted to extend through mid-recesses.

B represents the hub of the wheel.

We will now proceed to describe our improved manner and devices for tensioning the spokes of the wheel without reference to that part of our invention which relates to forming the spokes of a single piece of wire, as said tensioning devices are applicable to wire spokes of any construction, and we do not limit ourselves to their use with our special form of spokes.

C represents a disk provided on its inner side with clutch-teeth $c$. This disk is rigidly secured to a sleeve, C', which forms the hub of the wheel, and is adapted to turn on the axle, and is screw-threaded at its outer end, $c'$, to receive a jam-nut, $c^2$.

D represents a second spoke-receiving disk, having a central perforation, $d$, and an annular series of clutch-teeth, $d'$, arranged within said perforation.

E represents a semi-cylindrical brace, provided at each end with clutch-teeth $e$. This brace, in connection with a second one, its counterpart in construction, is adapted to hold the disks C and D apart and in their rotated or angular position, as will be hereinafter more fully described.

The spokes F of the wheel being secured in position upon the felly A and the disks C and D, the latter are forced apart, the disk D sliding upon the sleeve C'. The clutch-braces E are then placed in position upon the sleeve, and the teeth $e$ are forced to engage with the teeth $c$ and $d'$, thus securely holding the disks apart and tensioning the wire spokes. The latter are further tensioned by giving a part revolution to each disk in opposite directions. The disks are held in their rotated position by means of the engagement of the teeth on either end of the brace E with the respective adjacent teeth $c$ and $d'$ of the disk. The jam-nut $c^2$ is then screwed upon the outer end of the sleeve C' to firmly secure the parts together. The jam-nut $c^2$ is provided on its outer side with an annular flange, $c^3$.

We will now refer to our improved manner of forming the spokes, the same consisting in forming two or more spokes of one piece of metal or wire, as hereinbefore described. The felly A is provided with an interior annular recess, $a$. The two disks C D are also each provided with an annular recess, $c^4$ $d^4$. In Fig. 12 is represented one form of securing the ends of the spoke-forming wire to the wheel. We secure one end of the wire within the recess $a$ of the felly, at any desired point, by a screw, $c^5$. The wire is then bent and secured around a double-headed rivet, $a'$, extending through the recess $a$ at right angles thereto. It is then bent to form a spoke, F, and is passed around a similar double-headed rivet, $f$, extending through the recess $f^4$ $c^4$ of the disk C. It then extends up and around a second rivet, $a'$, of the felly, and is then bent downwardly and passed around a rivet, $f'$, within the recess $f^4$ of the disk D. The wire is then carried around another rivet, $a'$, of the felly, and again to the disk C, so that each alternate pair of spokes will be secured to said disk, while the remaining pairs will be secured in like manner to the disk D. When all of the spokes have been formed the wire is cut and the projecting end is secured, as illustrated in Fig. 12, by a washer, $c^5$, and screw $c^6$.

It is evident that it is not necessary that all of the spokes or pairs of spokes should be formed from one continuous piece of wire; hence, if desired, the wire may be cut into sections of convenient length and arranged as described the essential feature being the formation of more than two spokes of a continuous piece of metal.

It will be apparent that if a metallic felly combined with spokes of the construction hereinbefore described, were used without a protector, or in direct contact with a metallic tire, the effect in the first case would be to draw the felly, and thus unduly strain the spokes, while in the latter case the tire would be unduly drawn and enlarged. To obviate these difficulties we interpose between the felly A and tire X an elastic layer or bushing, Y, which effectually prevents the objectionable effects referred to, and admits of the use with our improved wheel of the usual metallic protecting-tire.

Many slight changes in the form and details of construction may be resorted to without departing from the spirit of our invention; and we therefore do not limit ourselves to the exact construction shown and described, but reserve the right to make all such changes of form as may properly fall within the scope of our invention.

What we claim is—

1. The combination, with a metallic wheel whose alternate spokes or pairs of spokes are secured to separate disks or flanges on the hub and adapted to be tensioned by lateral separation and rotation, of devices for holding said disks apart and in their rotated position, substantially as set forth.

2. The combination, with a wheel whose alternate spokes or pairs of spokes are adapted to be secured to separate disks or flanges on the hub, of toothed flanges and a similarly-toothed brace or braces adapted to hold mid-disks apart and to clutch the same upon their being rotated, substantially as set forth.

3. The combination, with a wheel whose alternate spokes or pairs of spokes are secured to separate disks or flanges of the hub, of a disk provided with a sleeve forming the hub of the wheel, and a second disk perforated to slide upon said hub, and suitable devices for holding said disks apart and also in their rotated position, substantially as set forth.

4. In combination with the hub of a wheel, spoke-bearing disks or flanges provided with clutch-teeth and a toothed brace for engaging the teeth of the disks, substantially as set forth.

5. A metallic wheel the spokes of which are composed of a single length of wire so disposed and arranged as to form loops in the said wire, which project from the rim to the hub, each alternate loop being secured opposite to the hub-flanges and adapted to be tensioned simultaneously, substantially as set forth.

6. The combination of the hub-shank C and toothed disks with the brace-clutch E, having teeth *e*, the tension-spokes, and the recessed rim, as set forth.

In testimony whereof we affix our signatures in presence of two witnesses.

E. A. SPERRY.
JESSE VANDENBURGH.

Witnesses:
  JOHN W. SUGGETT,
  B. T. WRIGHT.